United States Patent
Ben-Itzhak et al.

(10) Patent No.: US 10,231,036 B1
(45) Date of Patent: Mar. 12, 2019

(54) HYSTERESIS-BASED OPTICAL CIRCUIT SWITCH SCHEDULER

(71) Applicant: INTERNATIONAL BUSINESS MACHINES CORPORATION, Armonk, NY (US)

(72) Inventors: Yaniv Ben-Itzhak, Kiryat-Yam (IL); Shay Vargaftik, Haifa (IL)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 15/811,844

(22) Filed: Nov. 14, 2017

(51) Int. Cl.
*H04Q 11/00* (2006.01)
*G02B 6/35* (2006.01)

(52) U.S. Cl.
CPC ....... *H04Q 11/0062* (2013.01); *G02B 6/3546* (2013.01); *G02B 6/3586* (2013.01); *H04Q 11/0005* (2013.01); *H04Q 11/0066* (2013.01); *H04Q 2011/0039* (2013.01); *H04Q 2011/0081* (2013.01)

(58) Field of Classification Search
CPC ........... H04Q 11/0062; H04Q 11/0005; H04Q 11/0066; H04Q 2011/0039; H04Q 2011/0081; G02B 6/3586; G02B 6/3546
See application file for complete search history.

(56) References Cited

U.S. PATENT DOCUMENTS

| | | | |
|---|---|---|---|
| 7,526,203 B2 * | 4/2009 | Tamil | H04L 45/00 398/47 |
| 8,295,700 B2 | 10/2012 | Shields et al. | |
| 8,503,879 B2 | 8/2013 | Xu et al. | |
| 2012/0148242 A1 * | 6/2012 | Chen | H04J 14/0254 398/49 |
| 2015/0125112 A1 | 5/2015 | Frankel et al. | |
| 2016/0037240 A1 * | 2/2016 | Yang | H04Q 11/0005 398/45 |
| 2016/0134954 A1 * | 5/2016 | Yang | H04L 12/6418 398/45 |
| 2016/0261364 A1 | 9/2016 | Jiang et al. | |
| 2016/0316284 A1 | 10/2016 | Javidi et al. | |
| 2016/0344641 A1 | 11/2016 | Javidi et al. | |

OTHER PUBLICATIONS

Al-Fares et al., "Hedera: Dynamic Flow Scheduling for Data Center Networks", USENIX NSDI 2010, 15 pages.
(Continued)

*Primary Examiner* — Leslie C Pascal
(74) *Attorney, Agent, or Firm* — Teddi E. Maranzano

(57) ABSTRACT

A method and system for configuring an optical circuit switch is provided. Configuring includes sampling for demand estimation at buffers of an electrical packet switch that is either directly connected to the optical circuit switch, or is dynamically routed to a physical port that is connected to the optical circuit switch. Configuring is performed based on the demand estimation at a port on the electrical packet switch exceeding a first dynamic threshold. The optical circuit can be released based on the demand estimation at the port on the electrical packet switch receding a second dynamic threshold, and the second dynamic threshold is less than the first dynamic threshold.

16 Claims, 9 Drawing Sheets

(56) References Cited

OTHER PUBLICATIONS

Alizadej et al., "Less is More: Trading a little Bandwidth for Ultra-Low Latency in the Data Center", Presented as part of the 9th USENIX Symposium on Networked Systems Design and Implementation, NSDI 12, 2012, 14 pages.
Bojja et al., "Costly Circuits, Submodular Schedules and Approximate Carathéodory Theorems", SIGMETRICS '16, Jun. 14-18, 2016, Antibes Juan-Les-Pins, France, 14 pages.
Calient, "S-Series Optical Circuit Switch", Features and Benefits, 2017 Calient Technologies, 2 pages.
Cao et al., "Per-packet Load-balanced, Low-Latency Routing for Clos-based Data Center Networks", CoNEXT'13, Dec. 9-12, 2013, Santa Barbara, California, USA, Copyright 2013 ACM, pp. 49-60.
Farrington et al., "Helios: A Hybrid Electrical/Optical Switch Architecture for Modular Data Centers", SIGCOMM'10, Aug. 30-Sep. 3, 2010, New Delhi, India, Copyright 2010 ACM, pp. 339-350.
Ghobadi et al., "ProjecToR: Agile Reconfigurable Data Center Interconnect", SIGCOMM '16, Aug. 22-26, 2016, Florianopolis , Brazil, © 2016 ACM, pp. 216-229.
Kapoor et al., "Chronos: Predictable Low Latency for Data Center Applications", SOCC'12, Oct. 14-17, 2012, San Jose, CA USA, Copyright 2012 ACM, 14 pages.
Legtchenko et al., "XFabric: A Reconfigurable In-Rack Network for Rack-Scale Computers", 13th USENIX Symposium on Networked Systems Design and Implementation, NSDI 16, 2016, pp. 1-15.
Linux, "Linux Administration", Learning by example, Linux Administration: Linux TCP Tuning, http://www.linux-admins.net/2010/09/linux-tcp-tuning.html, Accessed on Apr. 20, 2017, 7 pages.
Liu et al., "Circuit Switching Under the Radar with REACToR", 11th USENIX Symposium on Networked Systems Design and Implementation, NSDI 14, 2014, 15 pages.
Liu et al., "Scheduling Techniques for Hybrid Circuit/Packet Networks", CoNEXT '15, Dec. 1-4, 2015, Heidelberg, Germany, 13 pages.
Mizrahi et al., "TIME4: Time for SDN", Technical Report, Feb. 2016, arXiv:1505.03421v2 [cs.NI] Feb. 10, 2016, pp. 1-20.
Mizrahi et al., "Timed Consistent Network Updates", Technical Report, May 2015, arXiv:1505.03653v1 [cs.NI] May 14, 2015, This technical report is an extended version of [35], which was accepted to the ACM SIGCOMM Symposium on SDN Research (SOSR) '15, Santa Clara, CA, US, Jun. 2015, pp. 1-15.
Polatis, "Compact Automated Protection Switching Solution for Up to 16 RX/TX Line Pairs", Series 6000n-PSS, Protection Services Switch, Data Sheet, Achieve More with Optical Switching™, Rev. 6000n. PSS.102015.00, Copyright© 2015 Polatis, 2 pages.
Porter et al., "Integrating Microsecond Circuit Switching into the Data Center", SIGCOMM'13, Aug. 12-16, 2013, Hong Kong, China, Copyright 2013 ACM, 12 pages.
Wang et al., "Adaptive Policies for Scheduling with Reconfiguration Delay: An End-to-End Solution for All-Optical Data Centers", arXiv:1511.03417v1 [cs.NI] Nov. 11, 2015, pp. 1-14.
Wang et al., "c-Through: Part-time Optics in Data Centers", SIGCOMM'10, Aug. 30-Sep. 3, 2010, New Delhi, India, Copyright 2010 ACM, pp. 327-338.

* cited by examiner

United States Patent

HYSTERESIS-BASED OPTICAL CIRCUIT SWITCH SCHEDULER

BACKGROUND

The present disclosure relates to communications networks. More specifically, the present disclosure relates to a hysteresis-based optical circuit switch scheduler.

Modern cloud workloads feature diverse and dynamic communication patterns and demand high communication bandwidth. These workloads impose unprecedented scale and flexibility requirements on data center networks. Thus, it becomes challenging to design cost effective and scalable electrical packet switches for data center networks.

Optical switching technologies, such as Optical Circuit Switching and Free Space Optics, are being researched as promising candidates for addressing these data center network challenges. The advantages of integrating optical switching technologies in data center networks include higher bandwidth, lower latency, low power consumption, and low heat dissipation. However, switch reconfiguration may be slower as compared to electrical packet switching.

SUMMARY

The present disclosure provides a method for configuring an optical circuit switch. The method provides configuring an optical circuit, based on demand at a port on an electrical packet switch, a host, or hybrid switch exceeding a first dynamic threshold. The optical circuit can be released based on demand at the port on the electrical packet switch receding a second dynamic threshold, and the second dynamic threshold is less than the first dynamic threshold. However, the optical circuit is not necessarily removed unless there is a different circuit request that requires this particular port on the optical switch.

In another aspect of the present invention, a system for configuring an optical circuit switch is presented. The system includes a computer system having a processor, a computer-readable storage medium, and program instructions stored on the computer-readable storage medium being executable by the processor, to cause the computer system to perform a method. The method provides configuring an optical circuit, based on demand at a port on an electrical packet switch exceeding a first dynamic threshold. The optical circuit can be released based on demand at the port on the electrical packet switch receding a second dynamic threshold, and the second dynamic threshold is less than the first dynamic threshold. However, the optical circuit is not necessarily removed unless there is a different circuit request that requires this particular port on the optical switch.

In another aspect of the present invention, a computer program product in a computer networked environment for configuring an optical circuit switch is presented. The computer program product includes a computer readable storage medium having program instructions embodied thereon. The computer readable storage medium is not a transitory signal per se, and the program instructions are executable by a computer to cause the computer to perform a method. The computer program product includes configuring an optical circuit, based on demand at port on an electrical packet switch, a host, or hybrid switch exceeding a first dynamic threshold. The optical circuit can be released based on demand at the port on the electrical packet switch receding a second dynamic threshold, and the second dynamic threshold is less than the first dynamic threshold. However, the optical circuit is not necessarily removed unless there is a different circuit request that requires this particular port on the optical switch.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. The drawings are discussed forthwith below.

DETAILED DESCRIPTION

Figure 1:
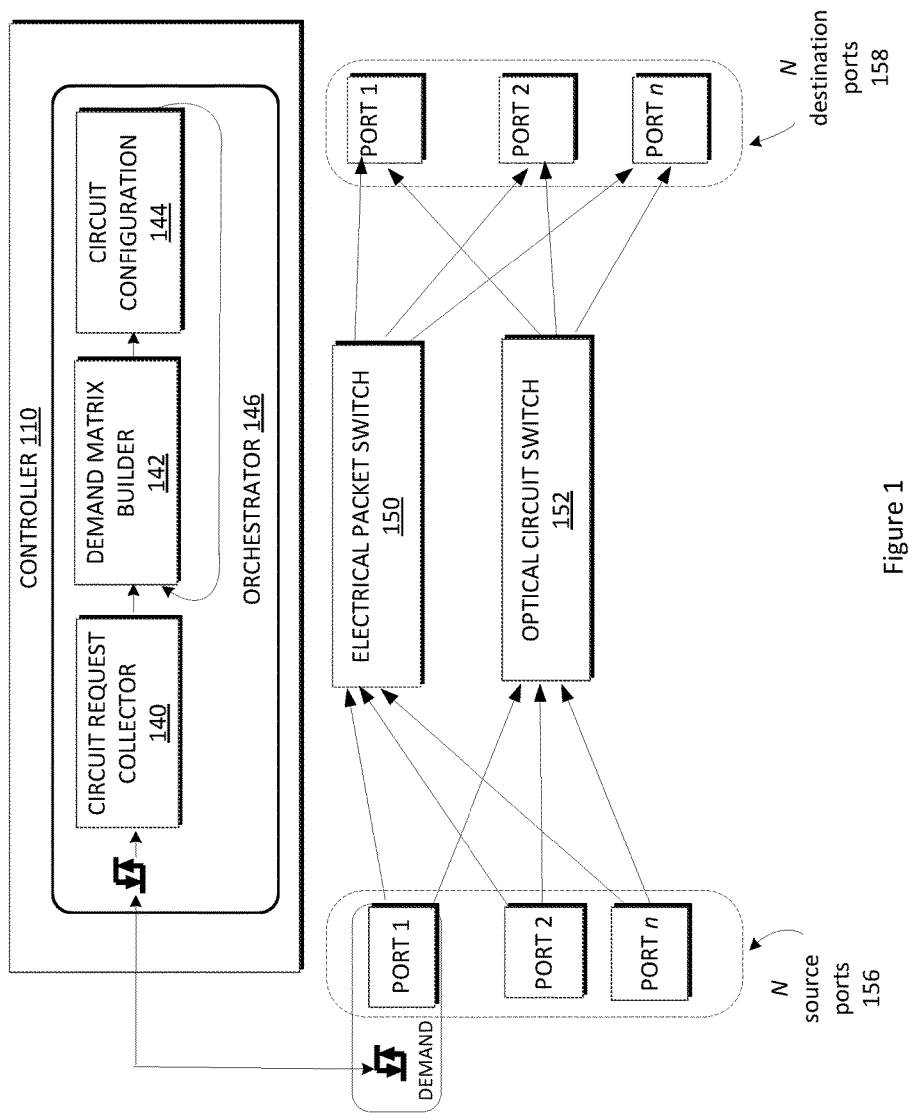
FIG. 1 is a schematic block diagram illustrating a high-level diagram of a private case of the disclosure.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

In current practice, optical circuit switching is not widely implemented in data center networks, in part due to issues with current schedulers such as a tendency to have long control loops, which contributes to circuit setup thrashing, as the scheduler attempts to respond to rapidly changing network traffic.

The disclosed embodiments introduce a practical hysteresis based on an optical circuit orchestrator/scheduler that tends to improve the overall performance of a hybrid network by shortening the control loop, thus increasing the optical circuit switch utilization and reducing circuit thrashing. In this context, a hybrid network is one having both optical circuit switches (OCS) and electric packet switches (EPS), controlled by at least one common controller. In the present disclosure, references to OCS can also include free space optics (FSO), which is an optical communication technology that uses light propagating in free space to wirelessly transmit data, radio frequency (RF) wireless technologies, and other similar technologies. The disclosed embodiments sample traffic at the network switches/routes tier below the OCS, thereby reducing the number of sampled entities, improving demand estimation, and avoiding circuit setup oscillations. Other sampling methods include host sampling and internal sampling, and network sampling (i.e., at any network switch/routes at any tier level of the topology). Various embodiments can employ a push approach to sampling, which permits partial switch reconfiguration, thereby making possible such improvements as lower power consumption, and lower computational overhead. Additionally, the various disclosed embodiments of the scheduler are self-contained and agnostic to the implementation particulars of the OCS.

FIG. 1 depicts an exemplary hybrid network switch environment for implementing various embodiments of the present disclosure. The electrical packet switch, also referred to as electrical packet plane, (EPS) 150 operates on an electric signal. Even though the EPS 150 may be connected to the network by fibre optic cables, the EPS 150 receives a wavelength which it then converts to an electric signal before directing it to an output port. By contrast, the optical circuit switch, also referred to as optical circuit plane, (OCS) 152, receives the wavelength on an input port, and through a series of mirrors and lenses, sends the wavelength to an output port.

The EPS 150 is configured with a plurality of source ports 156 and destination ports 158. A port is a host, i.e., a server or packet switch/router. In a hybrid switch, the ports may also be hosts, any network switches, routers, or the internal buffers of the hybrid switch. Each of the ports has a path to the EPS 150 and to the OCS 152. This allows the controller 110 to schedule traffic to either type of switch, depending on changing demand at a port. Only one switch of each type is shown for simplicity. However more than one OCS 152 and/or EPS 150 may be connected to the controller 110.

The controller 110 includes an orchestrator 146 that gathers demand and provides the circuit scheduling functions. Hysteresis can be employed globally at the orchestrator 146, with the ports continually sending their actual demand and notifications. The orchestrator 146 then filters the demand received from the ports by hysteresis. Alternatively, hysteresis can be employed in a distributed manner, at the ports, as shown with reference to source ports 156 and demand in FIG. 1. The orchestrator 146 receives circuit requests and circuit removal notifications, which are pushed from the ports.

In current operation, a controller collects demand by pulling it from all electrical packet switches every fixed period of time. Embodiments of the present disclosure allow an electrical packet switch to push its request to the controller 110, only when it requires an optical circuit, or can release one. Not all packet switches can be programmed through software or firmware to execute various embodiments of the present disclosure. For a more general approach, a host, such as a server, may be programmed, through drivers and/or agents, to sample and filter demand and push the results to the controller 110. The filtering improves the performance of the controller 110 by reducing the computation requirements due to the reduced amount of information being operated on by the orchestrator 146.

The circuit request collector 140 receives filtered demand requests from either the ports of servers or the packet switches. In this context, demand includes requests for circuit creation and for release of a circuit. The set of ports that are not connected to an optical circuit and the set of ports having an optical circuit that can be released are joined to form a list of free destination ports. Requests that meet the defined threshold move to the demand matrix builder 142 because these are the requests that require configuration of optical circuit.

The demand matrix builder 142 receives the filtered demand requests and the list of free destination ports from the circuit request collector 140 and builds and updates the demand matrix with pending and new requests. A network's demand matrix is a description, measure, or estimation of the aggregated traffic flows that enters, traverses, and leaves a network, as transmitted by the OCS 152 or the EPS 150. The circuit configuration 144 receives the demand matrix from the demand matrix builder 142 and sends instructions to the OCS 152 to reconfigure its circuit allocation. This approach, using filtering by hysteresis and push requests, allows for partial optical switch configuration. Those pairs of optical circuits that are in use, but meeting a demand threshold, are not changed.

Control Loop:

The time it takes to complete a single iteration of a control loop is a factor that affects the efficiency of the optical links in an OCS. A longer control loop poorly utilizes the optical links because there is a delay in responding to demand in rapidly changing traffic. Further, such an environment may require deep buffers to sustain the traffic between scheduling port configurations. Control loop latency, and therefore efficiency, is influenced by the location of the controller, how and where demand is estimated, the circuit scheduling algorithm, and the type of optical circuit technology in use along with its corresponding reconfiguration penalty. In this context, the reconfiguration penalty is the amount of time during which the OCS is unavailable because the optical ports are being reconfigured based on newly estimated demand.

Control Loop Factors:

The location and type of the controller within the network, e.g., local or remote, can influence the control loop latency. For example, with a centralized local controller, even though the control loop may be short because of the proximity of the controller to the hosts, additional factors have much higher impact on the control loop latency. Such factors include the computational overhead of the controller, reconfiguration penalty of the switch, and the type of sampling used for demand estimation.

Demand Estimation:

In current practice, the traffic demand matrix may obtained by periodical sampling of the buffers' length at the hosts or network switches (i.e., pull approach). The traffic demand matrix is usually updated every fixed period of time that is typically longer than the reconfiguration penalty of the circuit. Then, upon update of the traffic demand matrix, a scheduling algorithm is employed.

Figure 2:
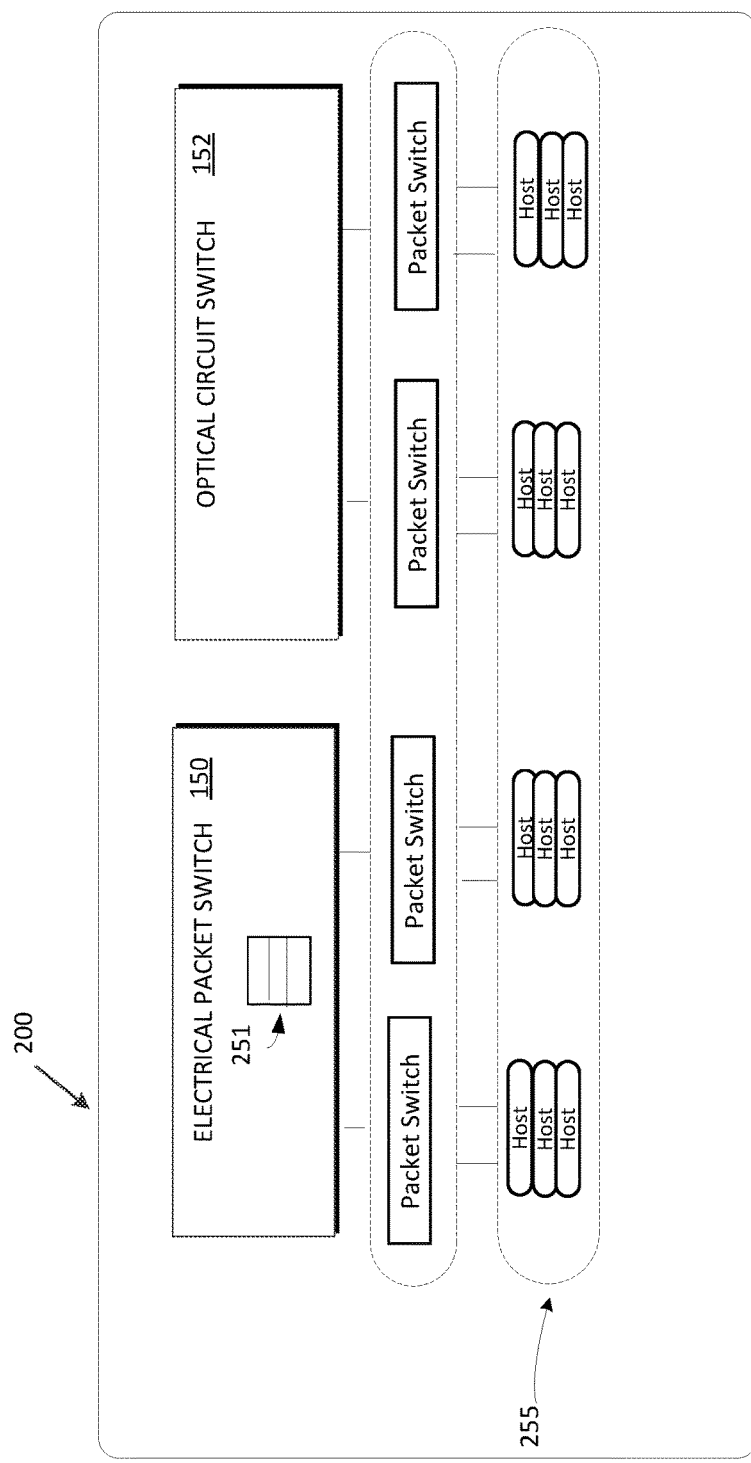
FIG. 2 is a schematic block diagram illustrating host sampling and network sampling in a network environment with optical and electrical network switches.

FIG. 2 depicts an environment, 200, with several hosts having paths to both an EPS 150 and an OCS 152. As shown, the EPS provides faster packet switching than the OCS 152. Packet switching is a method of grouping data transmitted over a digital network into units referred to as packets, which are composed of a header to direct the packet to its destination and a payload. A host may initially connect through a hierarchical topology through several tiers of packet switches to the EPS 150 switch. Subsequently, the traffic flows from the hosts can either route through the EPS 150 or the OCS 152 based on the network (i.e., routing and circuit switch) configuration by the controller, which depending on the network demand. FIG. 2 further depicts two approaches for obtaining a demand matrix, i.e., host sampling and network sampling.

In current practice, host sampling, the controller samples the network buffers at the hosts, shown here as hosts 255, to obtain the demand matrix, and aggregates the samples according to the port destination.

In network sampling, the buffers of the network switches at any tier level, (shown as "Packet Switch") are sampled. Other network sampling option include the sampling of the EPS switches 150, here shown as buffers 251. The EPS 150 switch is connected in parallel to the circuit switch and therefore already contains the aggregated view of the demand.

Figure 2A:
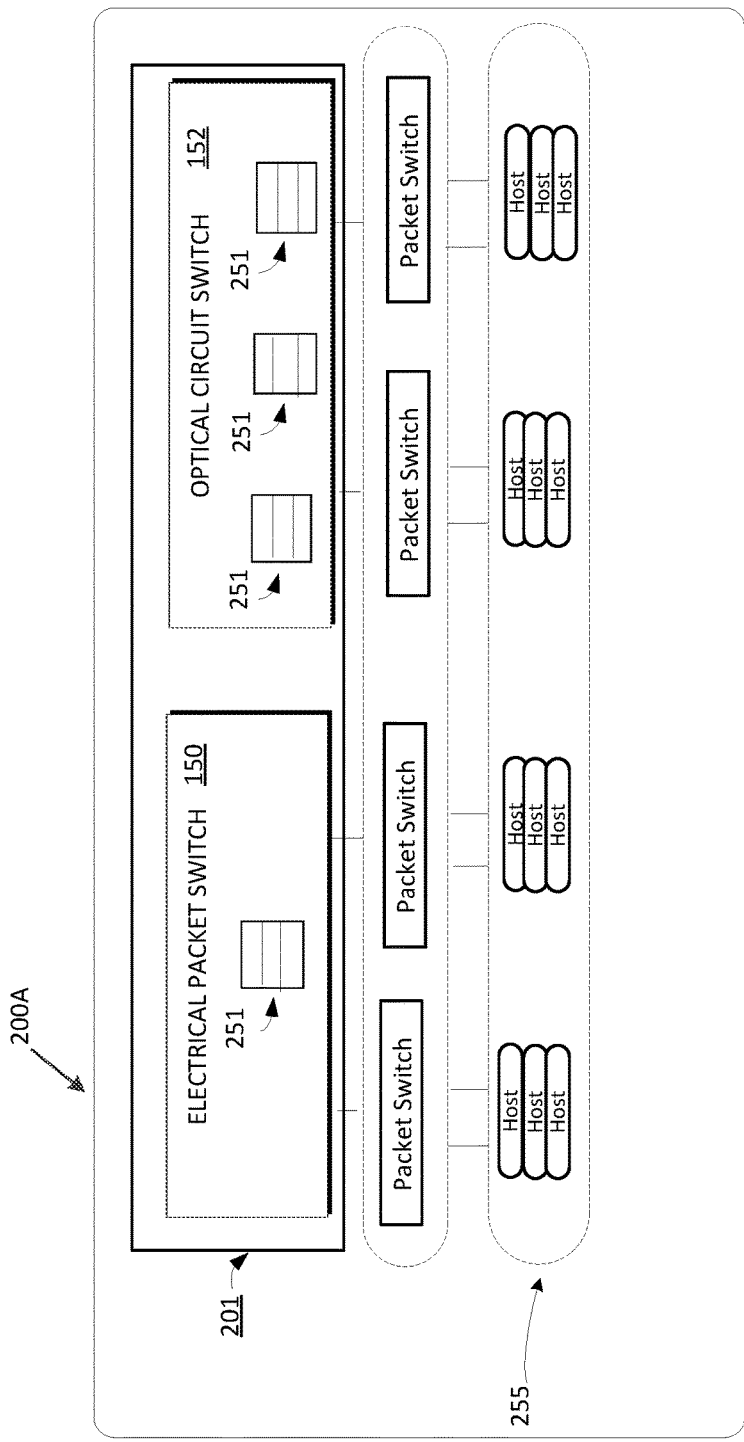
FIG. 2A is a schematic block diagram illustrating internal sampling in a network environment with hybrid optical-electrical network switches.

FIG. 2A depicts internal sampling in a hybrid optical-electrical network 200A. In a hybrid configuration, the EPS 150 and the OCS 152 are included together in one module 201. This is a variation of last hop sampling. In this approach the buffers are located within the same physical device as the circuit switch itself, shown here as buffers 251. Because of the buffer location, internal sampling can be faster than either host sampling or network sampling.

Circuit Scheduling Algorithm:

Optical circuit scheduling algorithms calculate the optical ports matching, i.e., the configured circuits and the corresponding flows which are routed through them. Traffic flows which have not been scheduled to the optical circuit switch are either transmitted through the default routing plane (e.g., packet switch, or another (semi)constant optical network), or blocked/buffered until they are scheduled to the OCS.

Known options for circuit scheduling include maximum cardinality matching. This approach suggests that the controller should maximize the number of created circuits. Another option, the maximal weight matching (MWM) circuit scheduling algorithm, suggests that the controller should maximize the potential traffic over the created circuits according to the current buffer occupancy. In yet another circuit scheduling algorithm, the stable marriage approach suggests that each port can also state the preference within its request among the different destinations and in a distributed manner a stable match is configured by the ports.

When these circuit scheduling algorithms are applied on all ports in the OCS components, the computation of the demand and destination for even a small number of ports is added to the overhead. Thus, the computational overhead is a significant lower bound on the control loop latency. The scheduling globally calculates new port matches for all ports of the OCS. Such a global scheduling approach incurs a high penalty in terms of computation requirements.

In current practice, the scheduling contributes to the control loop latency. The delays within the control loop may cause poor utilization of the optical links and long delays, due to scheduling decisions, which are no longer aligned with the current traffic demand. Even though new demand arrives continuously, scheduling may be recalculated every fixed period, resulting in a lack of responsiveness to rapidly changing traffic patterns.

Figure 3:
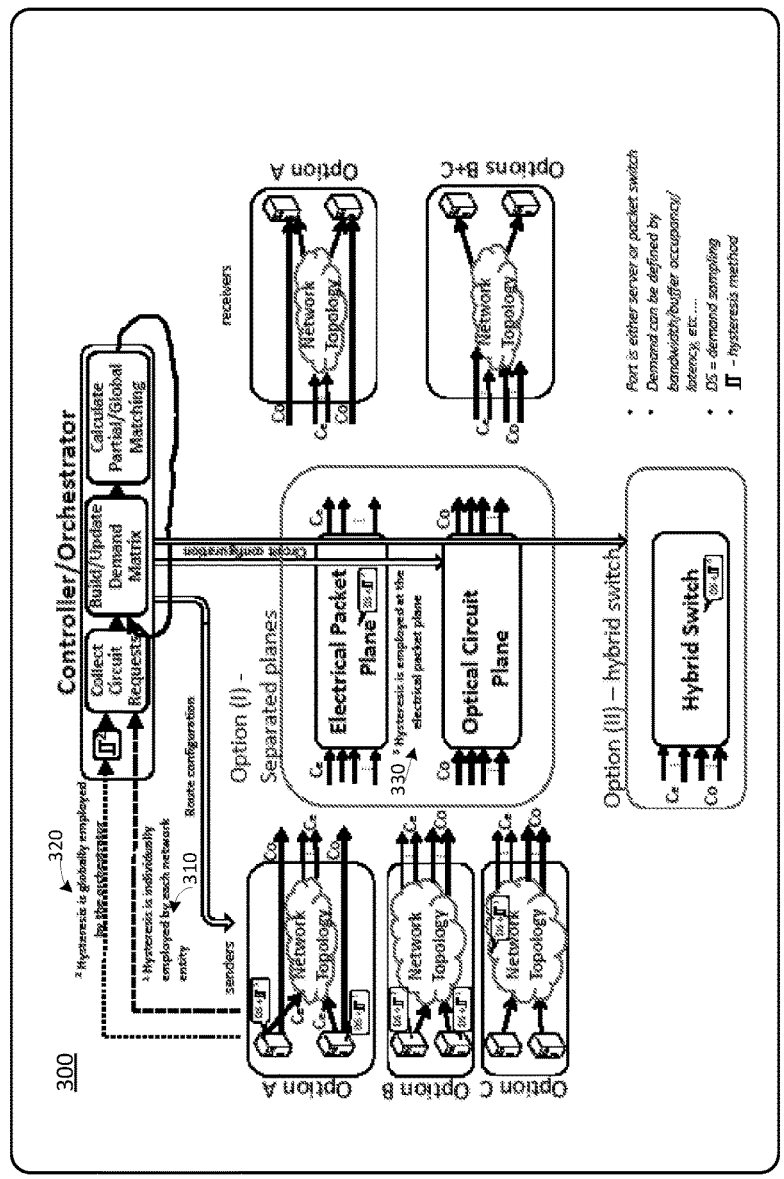
FIG. 3 is a schematic block diagram illustrating a plurality of network topology, sampling options, and hysteresis implementation location options.

FIG. 3 illustrates a plurality of network topology options. In Option A, each server samples its own demand, and employs the hysteresis method for sending optical circuit requests and notifications (310), or sends the demand sampling to the controller, which globally employs the hysteresis method (320). The server itself is also directly connected to the optical circuit switch plane, and therefore is configured by the controller 110 to route selected traffic through an established optical circuit.

In Option B, each server samples its own demand, and employ the hysteresis method for sending optical circuit requests and notifications (310), or sending the demand sampling to the controller 110, which globally employs the hysteresis method (320). The servers are connected to a network topology, in which some or all of the switches/routers are connected to both the electrical packet plane and the optical circuit plane. The controller 110 configures the corresponding network switches/routers to route the selected traffic through the established optical circuits.

In Option A and Option B, the controller 110 should aggregate the servers requests/notifications to conduct a demand matrix which expresses the traffic demand at the EPS 150 and OCS 152 plane level, in order to decide which circuit should be established according to the aggregated traffic that should be served by it. This also applies to any other option in which the demand is sampled at a network location which does not represent the demand at the OCS 152 level.

In Option C, the servers are connected to a network topology, in which some or all of the switches/routers are connected to both the electrical packet plane and the optical circuit plane. Some or all of the switches/routes sample the demand and employ the hysteresis method for sending optical circuit requests and notifications (310), or sending the demand sampling to the controller, which globally employs the hysteresis method (320). The controller 110 configures the corresponding network switches/routers to route the selected traffic through the established optical circuits.

In another option, the electrical packet plane, 330 or the hybrid switch, samples the demand and employ the hysteresis method for sending optical circuit requests and notifications (310), or sending the demand sampling to the controller, which globally employs the hysteresis method (320).

Figure 4:
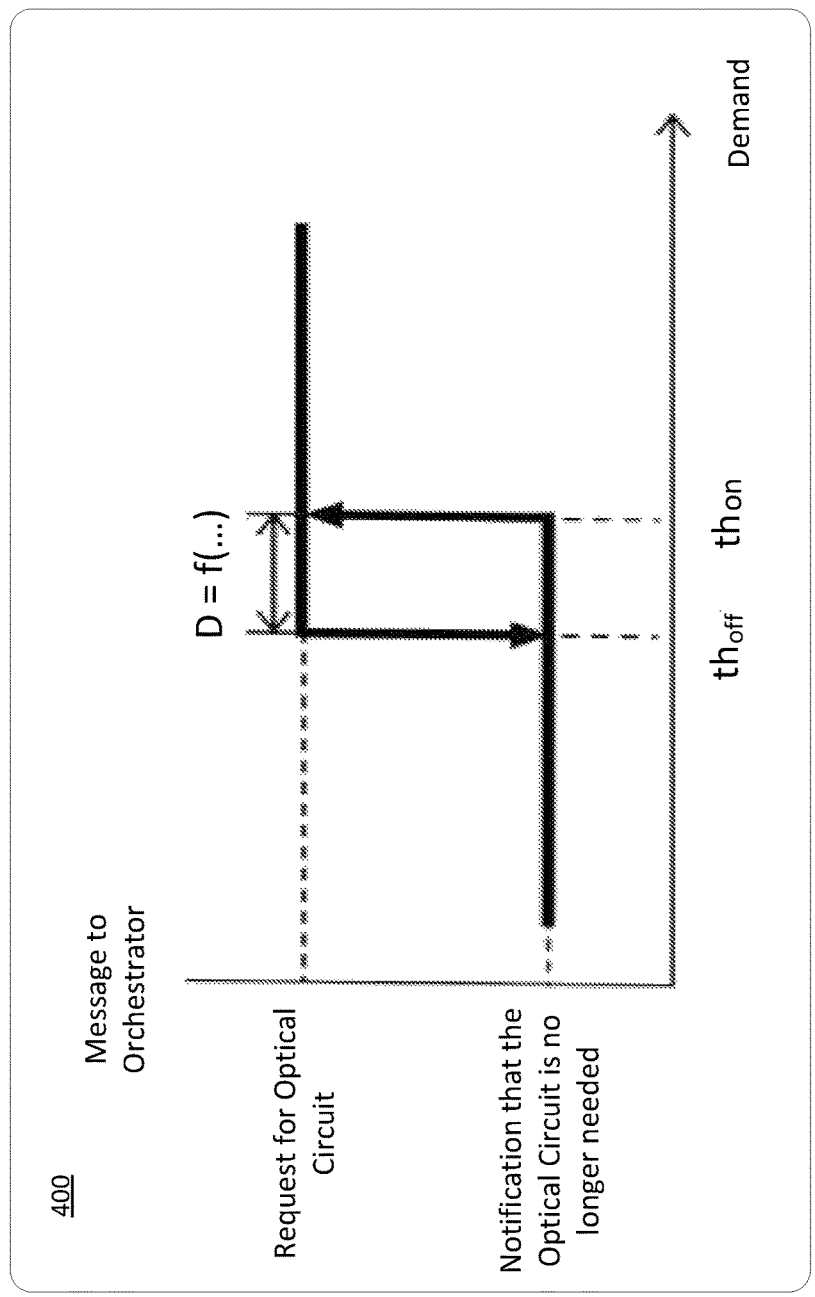
FIG. 4 is a schematic block diagram illustrating a circuit scheduling operation at a port in terms of hysteresis.

FIG. 4 depicts a circuit scheduling operation in terms of hysteresis. A request to configure a new optical circuit is triggered by exceeding a dynamic threshold $th_{on}$. A request to remove an existing optical circuit is triggered by receding a different threshold $th_{off}$, where ($th_{off} < th_{on}$). A threshold can be defined in terms of bandwidth, number of bytes, or latency, for example. In FIG. 4, the hysteresis function is defined in terms of demand over time for a given bandwidth: $D = th_{on} - th_{off} = f(\ldots)$, which can be defined according to a function of different parameters. This is the hysteresis function that controls the rate at which a circuit may be reconfigured. A request for an optical circuit is sent to the orchestrator 146 if the demand is high enough. If the optical circuit is assigned, the demand is re-routed from the EPS 150 to the OCS 152. This re-routing incurs a configuration penalty. If the demand is low enough, ($th_{off} < th_{on}$), then a notification is sent to the orchestrator 146 that the optical circuit is no longer required and can be removed.

Figure 5:
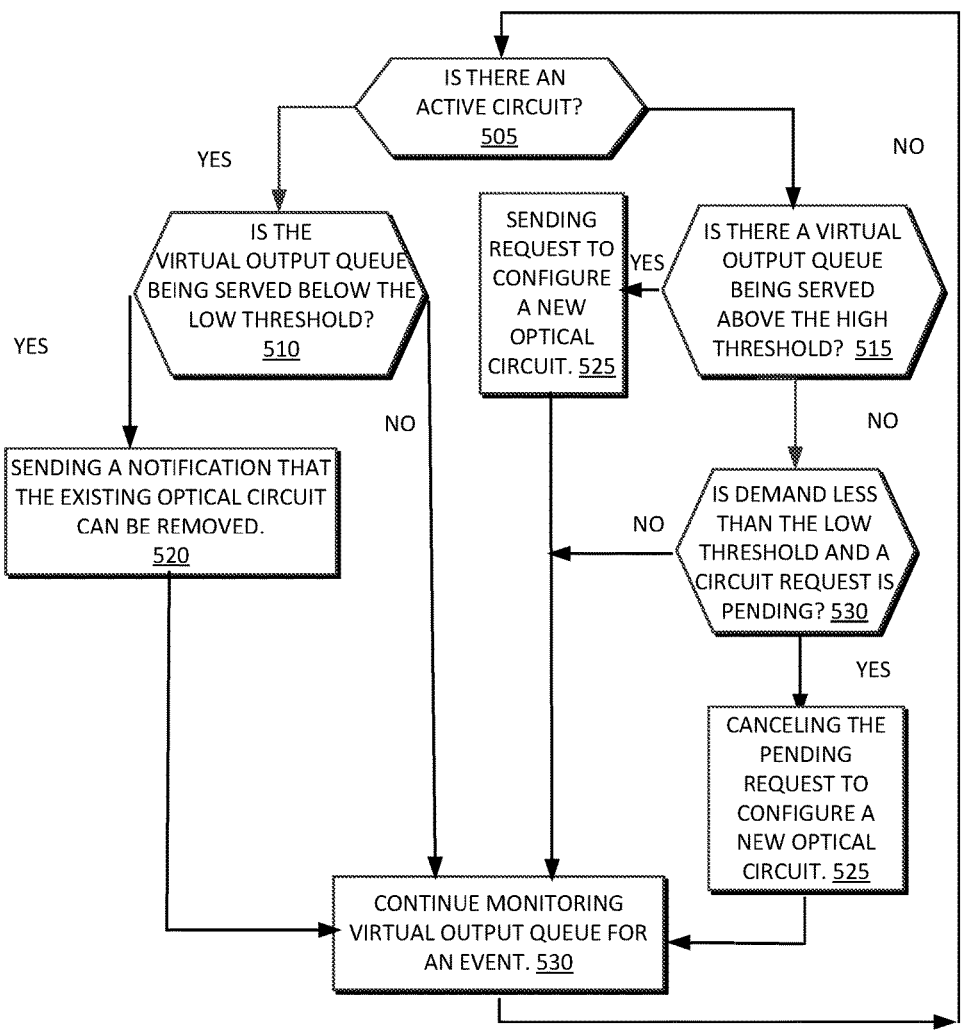
FIG. 5 is a port state diagram of a circuit scheduling operation in terms of hysteresis.

FIG. 5 depicts a port state diagram of a circuit scheduling operation in terms of hysteresis. At 505, the port checks whether it's assigned with an optical circuit. If yes, and the corresponding buffer occupancy is below the low threshold (510), the port sends a notification to the controller 110 that the existing optical circuit can be removed, particularly if the optical circuit is needed to satisfy another request (520). The port then continues to monitor its buffers for a triggering event (530). Returning to step 505, if there is no assigned optical circuit, and the buffer occupancy above the high threshold (515), the port sends a request to the controller 110 to configure a new optical circuit (525). The port then continues to monitor its buffers for a triggering event (530). Returning to step 515, if there is no assigned optical circuit, and the corresponding buffer occupancy is less than the low threshold, and the port has a circuit request pending (530). In that case, the port cancels its request to configure the new optical circuit (525). The port continues to monitor its buffers, and wait for a triggering event (530). The triggering events include but are not limited to: 1) there is no active circuit and at least one buffer occupancy crossed the higher threshold; and 2) there is an active circuit in favor of one of the buffers and its occupancy became lower than the lower threshold; 3) event based, such as exceeding a minimum number of pending requests; and 4) every fixed period of time. At other states, the port monitors the buffers and the state machine is idle.

Figure 5A:
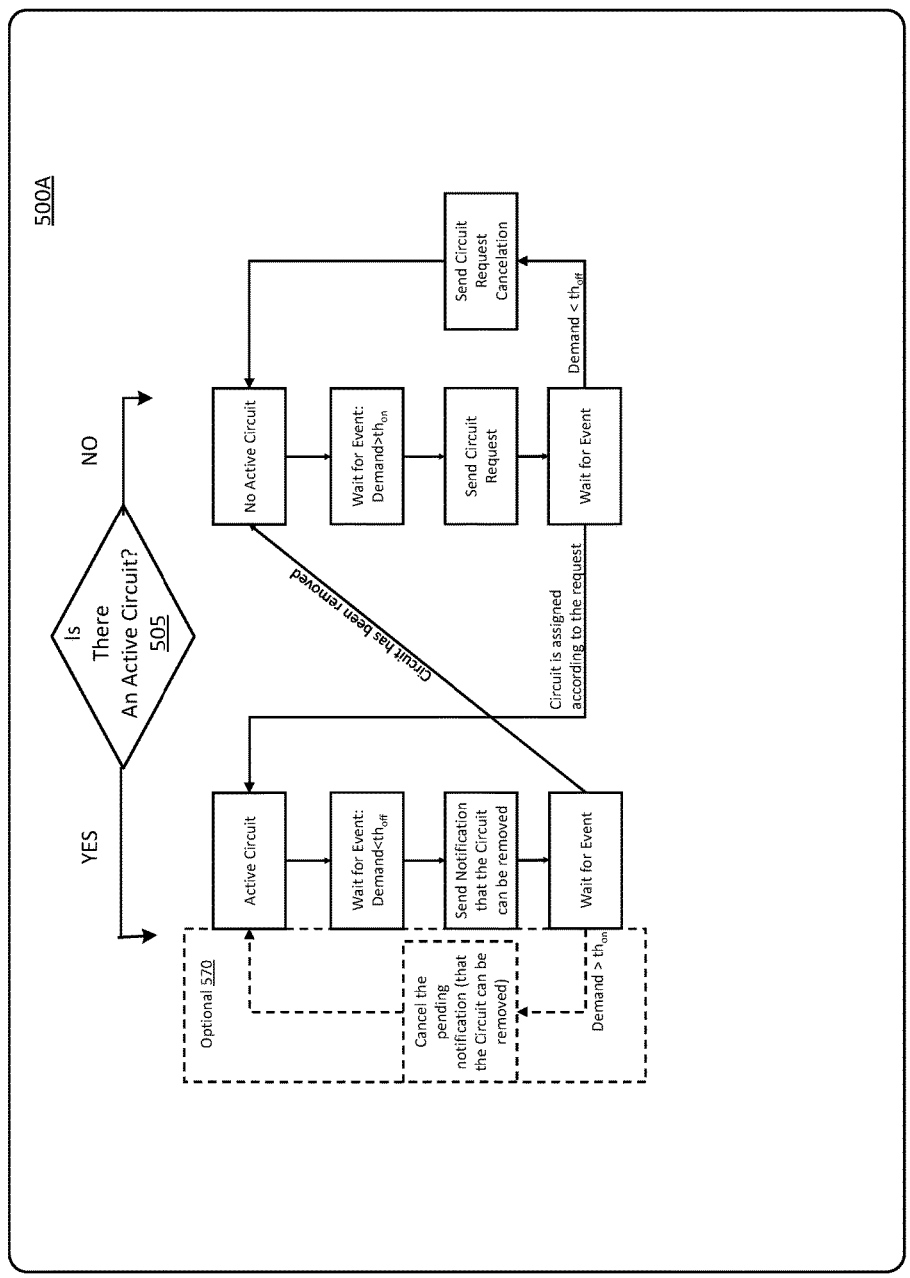
FIG. 5A is an alternate a port state diagram of a circuit scheduling operation in terms of hysteresis.

FIG. 5A depicts an alternate port state diagram of a circuit scheduling operation in terms of hysteresis. This embodiment can reduce state changes as compared with the embodiment of FIG. 5. For instance, in the embodiment of FIG. 5, when there is an assigned optical circuit, every time the buffer occupancy crosses the lower threshold, a notification will be sent to the controller. Actually, steps 505, 510, and 520 might execute repeatedly until the corresponding optical circuit is removed. FIG. 5A presents an alternative state diagram, which avoids such repeated state changes for the case when a request has been sent until the time the optical circuit is actually assigned, and for the case when a notification for circuit removal has been sent until the time the optical circuit is actually removed. Step 570 allows for cancellation of a pending optical circuit removal notification, for the case that the buffer occupancy was below the lower threshold (and a corresponding optical circuit removal notification has been sent), and after a while the buffer occupancy exceeds the higher threshold, before the optical circuit has been removed. Step 570 enables the port to keep using the optical circuit in such case and avoid its removal. However, such option might degrade the optical circuit scheduling fairness of the network.

Known methods to maintain the hysteresis thresholds include fixed and dynamic thresholds. In the fixed thresholds policy, $th_{on}$ and $th_{off}$ have fixed values. Dynamic thresholds may dynamically configure either $th_{on}$ or $th_{off}$ or both according to different network parameters, and conditions. The dynamic policy can also be used to provide quality of service (QoS), i.e., the lower $th_{on}$, the faster a port requests for a circuit. Alternately, QoS can be accomplished by, for example, buffer occupancy multiplied by different weights.

Embodiments of the present disclosure can be applied to host sampling, network sampling, or more generally by any network switches or by the electrical packet plane, and for a hybrid switch, internal sampling to estimate demand.

As discussed previously with respect to FIG. 1, a short control loop efficiently utilizes the optical links by responding to rapidly changing traffic demand, and may also require smaller and fewer buffers to sustain traffic between reconfigurations.

Figure 6:
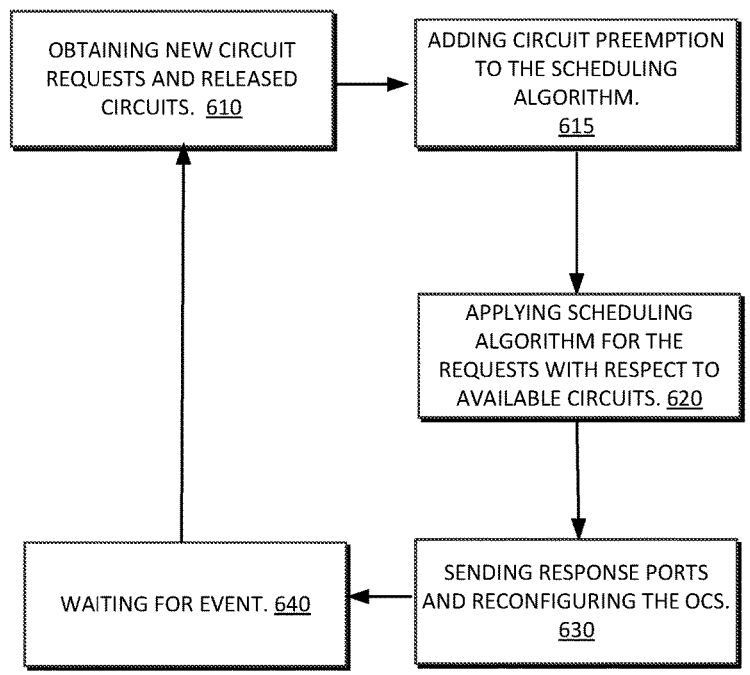
FIG. 6 is a state diagram depicting a controller operation in terms of hysteresis.

FIG. 6 is a state diagram depicting a controller operation in terms of hysteresis. At 610, the controller 110 receives requests for new optical circuits and notifications that existing optical circuits can be released. At 615, the orchestrator 146 optionally adds circuit preemption to the scheduling algorithm. This allows active optical circuits with a lifetime above a given time-based threshold to be removed in order to avoid starvation of other ports with pending requests for new optical circuits. The time-based threshold presents a tradeoff between fairness and efficiency. Setting it low results in better fairness but may lead to frequent circuit oscillations that both increases the complexity of the scheduling resolutions and degrades the circuit utilization due to frequent reconfigurations, and hence incurring configuration penalty every reconfiguration. On the other hand, setting it high may result in buffers holding on to circuits too long that might lead to unfair circuit sharing. In general, this threshold can be configured according to the OCS 152 configuration penalty, $\delta$ (e.g., $k*\delta$ when k higher than 2).

At 620, the orchestrator 146 applies the scheduling algorithm only with respect to the potential available optical circuit ports. The scheduling algorithm may include known fairness scheduling methods. Subsequently at 630, circuit configuration 144 sends instructions to the OCS 152 to reconfigure the optical ports, and to the ports 156 (and any other network entity between the port and the circuit switch) to route the assigned traffic to each circuit accordingly. At 640, the controller 110 then waits for a triggering event, which can be the arrival of a new request from a port. The triggering event can also include a time period (e.g., a scheduling window), and exceeding a minimum number of pending requests.

Figure 7:
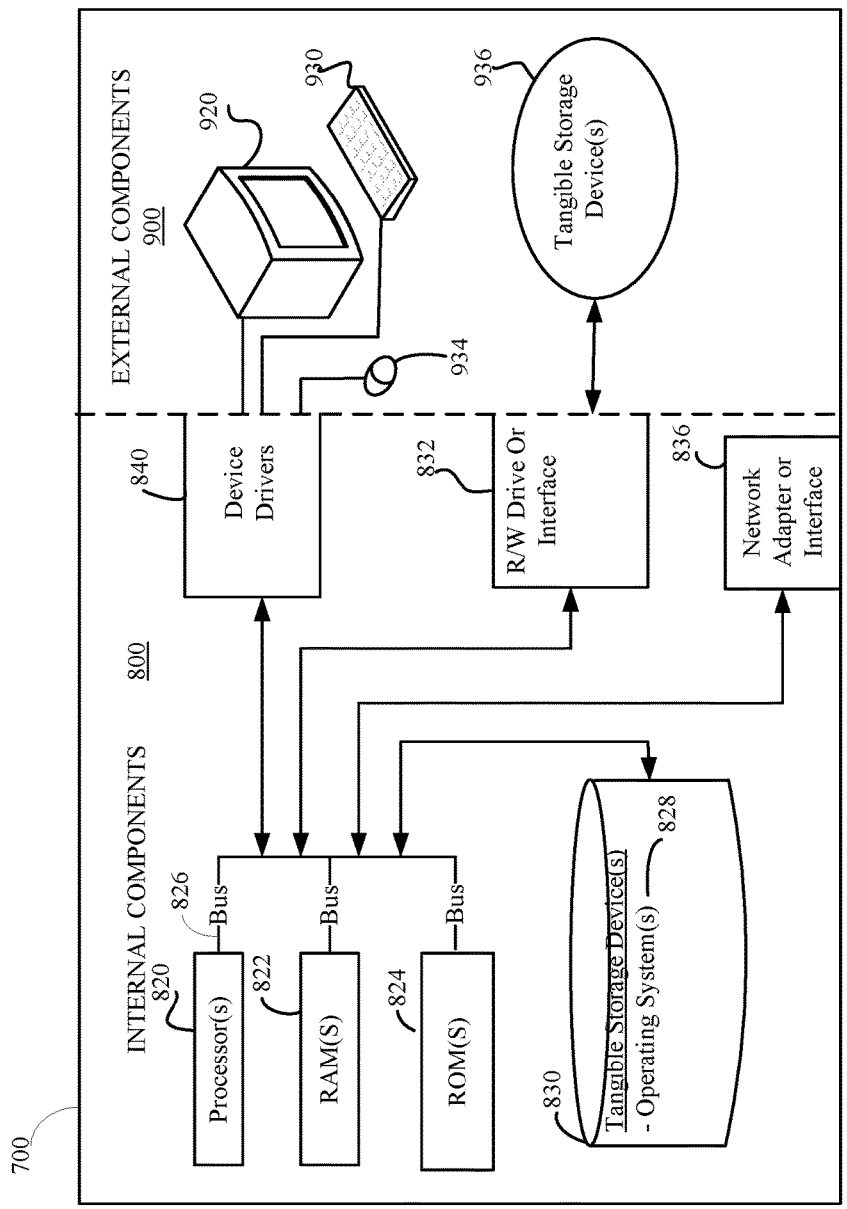
FIG. 7 is a schematic block diagram of hardware and software of the computer environment according to an embodiment of the method of FIGS. 5-6.

Referring now to FIG. 7, computing device 700 may include respective sets of internal components 800 and external components 900 that together may provide an environment for a software application, such as a service hub for cloud based document access. Each of the sets of internal components 800 includes one or more processors 820; one or more computer-readable RAMs 822; one or more computer-readable ROMs 824 on one or more buses 826; one or more operating systems 828; one or more software applications, executing the method of FIGS. 5-6; and one or more computer-readable tangible storage devices 830. The one or more operating systems 828 and software applications, are stored on one or more of the respective computer-readable tangible storage devices 830 for execution by one or more of the respective processors 820 via one or more of the respective RAMs 822 (which typically include cache memory). In the embodiment illustrated in FIG. 7, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 also includes a R/W drive or interface 832 to read from and write to one or more computer-readable tangible storage devices 936 such as a CD-ROM, DVD, SSD, memory stick, magnetic tape, magnetic disk, optical disk or semiconductor storage device.

Each set of internal components 800 may also include network adapters (or switch port cards) or interfaces 836 such as a TCP/IP adapter cards, wireless WI-FI interface cards, or 3G or 4G wireless interface cards or other wired or wireless communication links. The DBMS modules 829, and operating system 828 that are associated with computing device 700, can be downloaded to computing device 700 from an external computer (e.g., server) via a network (for example, the Internet, a local area network, or other wide area network) and respective network adapters or interfaces 836. From the network adapters (or switch port adapters) or interfaces 836 and operating system 828 associated with computing device 600 are loaded into the respective hard drive 830 and network adapter 836. The network may comprise copper wires, optical fibers, wireless transmission, routers, firewalls, switches, gateway computers and/or edge servers.

Each of the sets of external components 900 can include a computer display monitor 920, a keyboard 930, and a computer mouse 934. External components 900 can also include touch screens, virtual keyboards, touch pads, pointing devices, and other human interface devices. Each of the sets of internal components 800 also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Various embodiments of the invention may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although preferred embodiments have been depicted and described in detail herein, it will be apparent to those skilled in the relevant art that various modifications, additions, substitutions and the like can be made without departing from the spirit of the disclosure, and these are, therefore, considered to be within the scope of the disclosure, as defined in the following claims.

What is claimed is:

1. A method for configuring an optical circuit switch, comprising:
   receiving, by a circuit request collector of a controller, a request to configure or release an optical circuit, wherein the optical circuit comprises a logical connection between a port on an electrical packet switch and a port on an optical circuit switch;
   building, by a demand matrix builder of the controller, a demand matrix, wherein the demand matrix comprises optical circuit requests that meet defined thresholds;
   generating and sending, by a circuit configuration of the controller, instructions to the optical circuit switch, wherein the instructions include configuring a new optical circuit, based on demand at a port on the electrical packet switch exceeding a high dynamic threshold; and
   releasing the existing optical circuit, based on demand at the port on the electrical packet switch being less than a low dynamic threshold, wherein the low dynamic threshold is less than the high dynamic threshold.

2. The method of claim 1, wherein a controller receives actual demand globally from all ports connected to the controller and filters the received demand by hysteresis, wherein the filtering comprises moving the received requests that meet a defined threshold to the demand matrix builder, or wherein the filtering is performed at the port level and the resulting demand is pushed to the controller.

3. The method of claim 2, wherein the controller instructs the optical circuit switch to execute the generated instructions to reconfigure a part of its optical circuits.

4. The method of claim 1, wherein the port includes a host, server, packet switch, router, and internal buffers, wherein each port has a path to at least one electrical packet switch and at least one optical circuit switch.

5. The method of claim 1, wherein the high dynamic threshold and the low dynamic threshold are configured dynamically.

6. The method of claim 1, further comprising:
   monitoring, the buffers by the port of the electrical packet switch, for a triggering event, wherein the triggering event includes: 1) there being no active optical circuit and at least one buffer exceeds the high dynamic threshold; 2) there being an active circuit and the demand at the at least one buffer is less than the low dynamic threshold; 3) after a fixed period of time, including a scheduling window; and 4) exceeding a minimum number of pending requests; and
   upon receiving the triggering event, sending a reconfiguration notification to a controller to which the electrical packet switch is attached.

7. The method of claim 1, further comprising:
   applying, by a network controller, a scheduling algorithm, only upon the network controller receiving a triggering event from the electrical packet switch that is directly connected to the optical circuit switch, wherein the triggering event comprises: 1) a request to configure a new optical circuit; 2) a notification that the optical circuit can be removed; 3) a minimum number of requests/notifications; and 4) after a fixed period of time, including a scheduling window.

8. A system for configuring an optical circuit switch, the system comprising:
   a computer system comprising: a computer processor, a computer-readable storage medium, and program instructions stored on the computer-readable storage medium being executable by the processor, to cause the computer system to perform a method, comprising:
   configuring an optical circuit, based on demand at a port on an electrical packet switch exceeding a high dynamic threshold;
   releasing the optical circuit, based on demand at the port on the electrical packet switch being less than a low dynamic threshold, wherein the low dynamic threshold is less than the high dynamic threshold.

9. The system of claim 8, wherein a controller receives actual demand globally from all ports connected to the controller and filters the received demand by hysteresis, wherein the filtering comprises, moving from the received demand, the requests that meet a defined threshold to the demand matrix builder.

10. The system of claim 9, wherein fewer than all of the optical circuits connected to the optical circuit switch are reconfigured at the instruction of the controller.

11. The system of claim 8, further comprising:
   monitoring, the buffers by the port of the electrical packet switch, for a triggering event, wherein the triggering event includes: 1) there being no active optical circuit and at least one buffer exceeds the high dynamic threshold; 2) there being an active circuit and the demand at the at least one buffer is less than the low dynamic threshold; 3) after a fixed period of time; and 4) exceeding a minimum number of pending requests; and
   upon receiving the triggering event, sending a reconfiguration notification to a controller to which the electrical packet switch is attached.

12. The system of claim 8, further comprising:
   applying, by a network controller, a scheduling algorithm, only upon the network controller receiving a triggering event from the electrical packet switch that is directly connected to the optical circuit switch, wherein the triggering event comprises: 1) a request to configure a new optical circuit; and 2) a notification that the optical circuit can be removed; 3) a minimum number of requests/notifications; and 4) after a fixed period of time.

13. The system of claim 8, wherein the high dynamic threshold and the low dynamic threshold are dynamically.

14. A computer program product for configuring an optical circuit switch, the computer program product comprising a computer readable storage medium having program instructions embodied therewith, wherein the computer readable storage medium is not a transitory signal per se, the program instructions executable by a computer to cause the computer to perform a method, comprising:
   sampling for demand estimation by an electrical packet switch that is directly connected to the optical circuit switch, wherein the electrical packet switch pushes its request for an optical circuit to an attached controller;
   configuring an optical circuit, based on the demand estimation at a port on the electrical packet switch exceeding a high dynamic threshold and re-routing the demand from the electrical packet switch to the optical packet switch; and
   releasing the optical circuit, based on the demand estimation at the port on the electrical packet switch being less than a low dynamic threshold, wherein the low dynamic threshold is less than the high dynamic threshold.

15. The computer program product of claim 14, wherein a controller receives actual demand globally from all ports connected to the controller and filters the received demand by hysteresis, wherein the filtering comprises, moving from the received demand, the requests that meet a defined threshold to the demand matrix builder.

16. The computer program product of claim 14, further comprising:
   monitoring, the buffers by the port of the electrical packet switch, for a triggering event, wherein the triggering event includes: 1) there being no active optical circuit and at least one buffer exceeds the high dynamic threshold; 2) there being an active circuit and the demand at the at least one buffer is less than the low dynamic threshold; 3) after a fixed period of time; and 4) exceeding a minimum number of pending requests;
   applying, by a network controller, a scheduling algorithm, upon the network controller receiving a triggering event from the electrical packet switch that is directly connected to the optical circuit switch, wherein the triggering event comprises: 1) a request to configure a new optical circuit; and 2) a notification that the optical circuit can be removed; and upon receiving the triggering event, sending a reconfiguration notification to a controller to which the electrical packet switch is attached.

* * * * *